US009294179B2

(12) United States Patent
Frank et al.

(10) Patent No.: US 9,294,179 B2
(45) Date of Patent: Mar. 22, 2016

(54) GAIN NORMALIZATION CORRECTION OF PMI AND COI FEEDBACK FOR BASE STATION WITH ANTENNA ARRAY

(75) Inventors: Colin D. Frank, Park Ridge, IL (US); Tyler A. Brown, Mundelein, IL (US); Sandeep H. Krishnamurthy, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 598 days.

(21) Appl. No.: 13/367,799

(22) Filed: Feb. 7, 2012

(65) Prior Publication Data

US 2013/0202015 A1     Aug. 8, 2013

(51) Int. Cl.
*H04K 1/10* (2006.01)
*H04L 27/28* (2006.01)
*H04B 7/06* (2006.01)
*H04L 25/02* (2006.01)

(52) U.S. Cl.
CPC ............ *H04B 7/0632* (2013.01); *H04B 7/0634* (2013.01); *H04B 7/0639* (2013.01); *H04L 25/0204* (2013.01); *H04L 25/0228* (2013.01)

(58) Field of Classification Search
CPC ... H04B 7/0632; H04B 7/0634; H04B 7/0639
USPC .................. 375/219, 220, 260, 267, 295, 316
See application file for complete search history.

(56) References Cited

U.S. PATENT DOCUMENTS

| | | | |
|---|---|---|---|
| 7,333,835 B2 | 2/2008 | Nagaraj | |
| 7,599,714 B2 | 10/2009 | Kuzminskiy | |
| 7,613,248 B2 | 11/2009 | Ketchum et al. | |
| 7,970,365 B2 | 6/2011 | Martin et al. | |
| 7,999,625 B2 | 8/2011 | Krishnan | |
| 8,014,265 B2 | 9/2011 | Sarkar et al. | |
| 2008/0227477 A1 | 9/2008 | Dayal et al. | |
| 2009/0046569 A1* | 2/2009 | Chen et al. | 370/203 |
| 2009/0046570 A1 | 2/2009 | Sarkar et al. | |
| 2009/0046800 A1 | 2/2009 | Xu et al. | |
| 2009/0054093 A1 | 2/2009 | Kim et al. | |

(Continued)

FOREIGN PATENT DOCUMENTS

| | | |
|---|---|---|
| WO | 2008103317 A2 | 8/2008 |
| WO | 2009023681 A2 | 2/2009 |
| WO | 2011020235 A1 | 2/2011 |

OTHER PUBLICATIONS

Patent Cooperation Treaty, International Search Report and Written Opinion of the International Searching Authority for International Application No. PCT/US2013/022487, Apr. 17, 2013, 13 pages.

(Continued)

*Primary Examiner* — Freshteh N Aghdam

(74) *Attorney, Agent, or Firm* — Faegre Baker Daniels LLP

(57) ABSTRACT

A wireless communication device and a method therein includes estimating a channel for each of a plurality of transmit antenna ports using a reference symbol received from the corresponding antenna port, determining a composite channel estimate based on the estimated channels and based on a precoding matrix, and determining an updated composite channel estimate using the composite channel estimate and using a gain correction corresponding to the precoding matrix. The gain correction can be obtained over-the-air or computed at the wireless communication device.

22 Claims, 4 Drawing Sheets

(56) References Cited

U.S. PATENT DOCUMENTS

| | | |
|---|---|---|
| 2009/0093222 A1 | 4/2009 | Sarkar |
| 2010/0075705 A1 | 3/2010 | van Rensburg et al. |
| 2010/0082302 A1 | 4/2010 | Garudadri et al. |
| 2010/0220601 A1 | 9/2010 | Vermani et al. |
| 2010/0238824 A1 | 9/2010 | Farajidana et al. |
| 2010/0246651 A1 | 9/2010 | Baheti et al. |
| 2010/0255790 A1 | 10/2010 | Farajidana et al. |
| 2010/0260060 A1 | 10/2010 | Abraham et al. |
| 2010/0290449 A1 | 11/2010 | Van Nee et al. |
| 2011/0002415 A1* | 1/2011 | Nakao et al. .......... 375/296 |
| 2011/0068874 A1 | 3/2011 | Krishnan |
| 2011/0190005 A1* | 8/2011 | Cheon et al. ......... 455/456.1 |
| 2011/0317657 A1* | 12/2011 | Chmiel et al. ......... 370/331 |
| 2011/0317748 A1 | 12/2011 | Li et al. |

OTHER PUBLICATIONS

Lindmark, Bjorn: "Capacity of a 2×2 MIMO Antenna System with Mutual Coupling Losses", IEEE, 0-780308302-8/04, 2004, pp. 1720-1723.

* cited by examiner

GAIN NORMALIZATION CORRECTION OF PMI AND COI FEEDBACK FOR BASE STATION WITH ANTENNA ARRAY

FIELD OF THE DISCLOSURE

The present disclosure relates generally to wireless communications and, more particularly, to estimating, signaling and using array antenna pattern gain normalization correction factors, and corresponding methods.

BACKGROUND

The precoding matrices defined in the 3rd Generation Partnership Project (3GPP) wireless communication protocols and elsewhere are generally believed to yield a set of antenna patterns having equal energy. However, there is a contradiction in the specification in that if the precoding matrices are applied in a way that the resulting antenna patterns are equal in energy, the precoding matrix-based channel estimates used for demodulation, precoding matrix selection, and channel quality estimation will have scaling error. Furthermore, the scaling error will be a function of the precoding matrix. Conversely, if the precoding matrices are applied in such a way that the precoding matrix-based channel estimation is correct, then the resulting antenna patterns will not have equal energy and precoding matrix selection via feedback from the UE will not be optimal. In the selection of the precoding matrices in the 3GPP specification, it was assumed that the energy of the antenna pattern is equal to the energy of the precoding matrix. However, without normalization of the antenna patterns, it can be shown that for some precoding matrices, the energy of the resulting antenna pattern is significantly greater than the energy of the precoding matrix. Conversely, for other precoding matrices, the energy of the resulting antenna pattern is less than the energy of the precoding matrix. Without a model for energy gain or loss (e.g., ohmic heating, impedance mismatch) within the antenna array, the array pattern should be normalized such that the energy of the antenna pattern is equal to the energy of the precoding matrix for all precoding matrices in the codebook.

In 3GPP, the current method used to estimate the channel gain for the data assumes that no re-scaling of the antenna pattern is necessary to maintain unit energy for all precoding matrix indicators. If the data symbols are transmitted with equal energy for all precoding matrices and if no PMI-based renormalization is performed at the UE, the precoding matrix indicator/cell-specific reference symbol (PMI/CRS)-based channel estimate will be in error. In order to compute the optimal PMI—channel quality indicator (CQI) pair, the UE must be able to compute the complex channel that would result from the application of a given PMI. With the current model, the UE does not renormalize the pattern gain for each PMI and thus the corresponding channel gain estimate used to determine the CQI will erroneous. As a result, the wrong PMI-CQI pair may be sent to the UE. Further, even if the correct PMI is chosen, the corresponding CQI may be in error. The problems described above can be expected to be most significant when the eNB antenna array is closely spaced (e.g., half-wavelength spaced arrays). The normalization issue is less significant with diversity-spaced arrays but may still be problematic.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
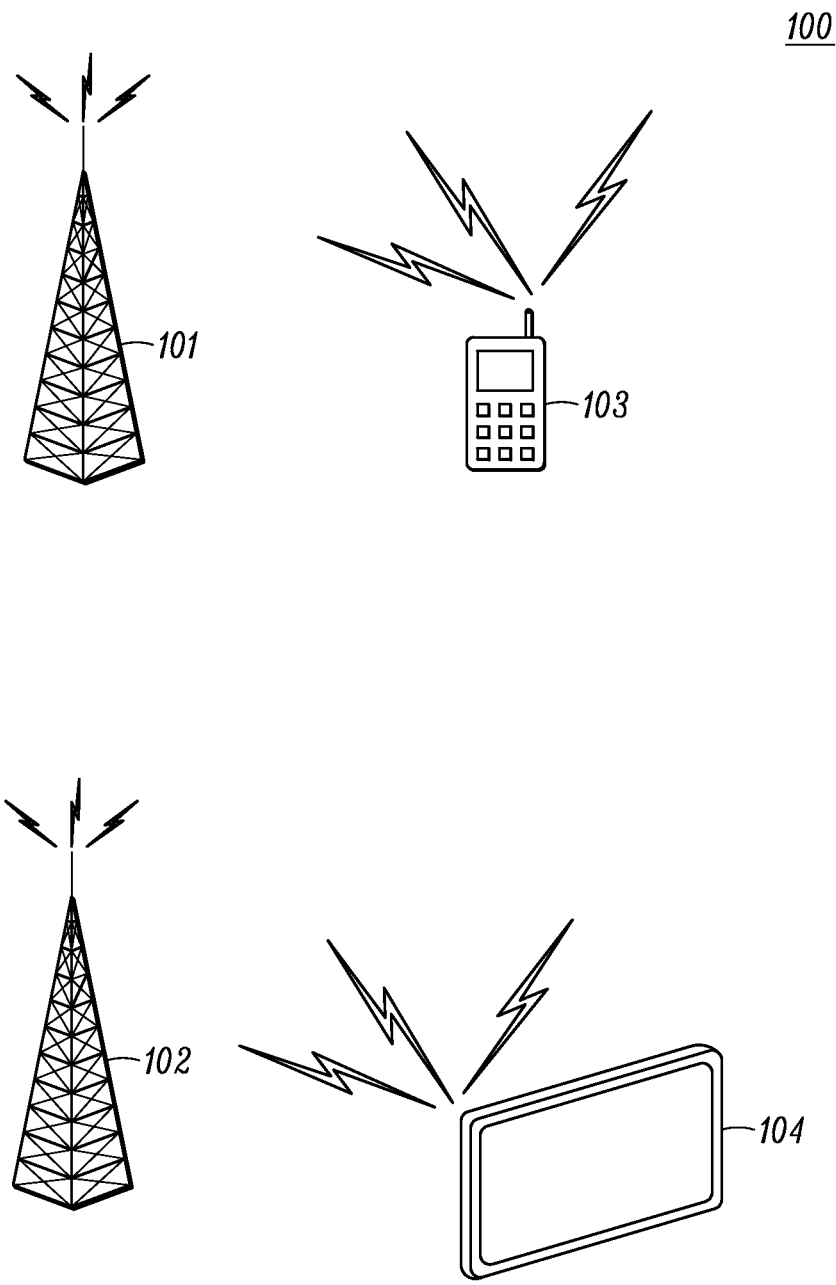
FIG. 1 illustrates a wireless communication system.

In FIG. 1, a wireless communication system 100 comprises one or more fixed base infrastructure units 101, 102 forming a network distributed over a geographical region for serving remote units in the time, frequency, code or spatial domain or a combination thereof. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, pico-cell, network node or by other terminology used in the art or as defined further below. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. The remote units may be fixed or mobile. The remote units may also be referred to as subscriber units, mobiles, mobile stations, mobile units, users, terminals, subscriber stations, user equipment (UE), user terminals, wireless communication devices, relay nodes, or by other terminology used in the art. The remote units also comprise one or more transmitters and one or more receivers. In FIG. 1, the base unit 101 transmits downlink communication signals to serve remote unit 103 in the time, frequency and/or spatial domain. The remote unit 104 communicates with base unit 102 via uplink communication signals. Sometimes the base unit is referred to as a serving or connected or anchor cell for the remote unit. The remote units may also communicate with the base unit via a relay node.

In one implementation, the wireless communication system is compliant with the 3GPP Universal Mobile Telecommunications System (UMTS) LTE protocol, also referred to as EUTRA that facilitate the use of multiple input single output (MISO) or multiple input and multiple output (MIMO) antenna systems on the downlink to increase capacity. In EUTRA, the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 8 (Rel-8) and later versions thereof. The present disclosure is more generally applicable to other existing or future wireless communication systems implementing MISO or MIMO transmissions on the uplink or downlink, such as the IEEE 802.11 and IEEE 802.16 series of specifications. Thus the disclosure is not intended to be implemented in any particular wireless communication system architecture or protocol.

In EUTRA systems, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator (RI), or the number of data streams sent on the same resources, precoding matrix index (PMI), and coding parameters such as a modulation and coding scheme (MCS) or a channel quality indicator (CQI). Together MCS or CQI, PMI and RI constitute elements of the Channel State Information (CSI) which conveys the quality of a MIMO channel indicative of the reliability and condition number of the channel capable of supporting multi-stream communications between the eNB and the UE. For example, if a UE determines that the link can support a rank greater than one, it may report multiple CQI values (e.g., two CQI values when rank=2 by signaling of the corresponding RI). Further, the link quality measurements may be reported on a periodic or aperiodic basis, as instructed by an eNB, in one of the supported feedback modes. The reports may include wideband or sub-band frequency selective information of the parameters. The eNB may use the rank information, the CQI, and other parameters, such as uplink quality information, to serve the UE on the uplink and downlink channels. Spatial multiplexing transmission can either be CRS-based (i.e., UE utilizes CRS for both CQI/PMI/RI estimation and for demodulation) or dedicated or demodulation reference symbol (DRS)-based (i.e., UE uses either CRS or CSI-RS for CQI/PMI/RI estimation and uses a DRS for demodulation).

In EUTRA systems, an uplink (UL) data channel may be a Physical Uplink Shared Channel (PUSCH), an UL control channel may be a physical uplink control channel (PUCCH), a downlink (DL) control channel may be a physical downlink control channel (PDCCH), and DL data channel may be a physical downlink shared channel (PDSCH). UL control information may be communicated over the PUCCH and/or the PUSCH and DL control information is communicated typically over the PDCCH. The UE may further transmit uplink sounding reference signals to assist the eNB on scheduling uplink transmission (for frequency division duplex (FDD)) and for one or both UL and DL transmissions for time-division duplex (TDD). On the UL, the UE may transmit using contiguous or non-contiguous resource allocations and the UE may also transmit data and control on the UL simultaneously using the so-called simultaneous PUCCH and PUSCH transmission scheme. In Frequency Division Duplex (FDD) operation, the frame structure in the UL and DL, each comprises of a 10 millisecond (ms) radio frame, which is in turn divided into ten sub-frames each having a 1 ms duration wherein each sub-frame is divided into two slots of 0.5 ms each, wherein each slot contains a number of OFDM symbols. The DL and UL bandwidth are subdivided into resource blocks, wherein each resource block (RB) comprises of one or more subcarriers in frequency and one or more OFDM symbols in the time domain (12 subcarriers×7 OFDM symbols for normal Cyclic Prefix (CP)). In LTE resource blocks are defined on a slot basis. A resource block (RB) is a typical unit in which the resource allocations are assigned for the uplink and downlink communications.

In EUTRA, the eNB configures appropriate channels for UL and DL control information exchange. For the DL, the PDCCH is used for sending the UL and DL control information to the UEs. The PDCCH is sent in the beginning portion of a sub-frame on a potentially variable number of OFDM symbols, and this number (typically 0 to 3 for large system bandwidths such as 5 MHz, etc. and 0 to 4 for smaller system bandwidths such as 1.25 MHz) is signaled on the Physical Control Format Indicator Channel (PCFICH) or sent via higher layer signaling. However, in other scenarios, the PDCCH may also be located in certain fixed or variable time/frequency/spatial resources i.e., spanning one or more subcarriers in one or more sub-frames and/or one or more spatial layers. For example, it may occupy a subset of resource blocks instead of spanning the entire DL system bandwidth. The Physical Hybrid ARQ Channel (PHICH) is the Acknowledgment indicator channel used to send the HARQ feedback on the DL for the UL data transmissions from the UE. The PCFICH, PHICH, PDCCH are sent on OFDM symbols at the beginning of the DL sub-frames. In some sub-frames such as ABS or when the eNB has no UEs scheduled (i.e., very low or no load cases) these channels may be absent.

Figure 2:
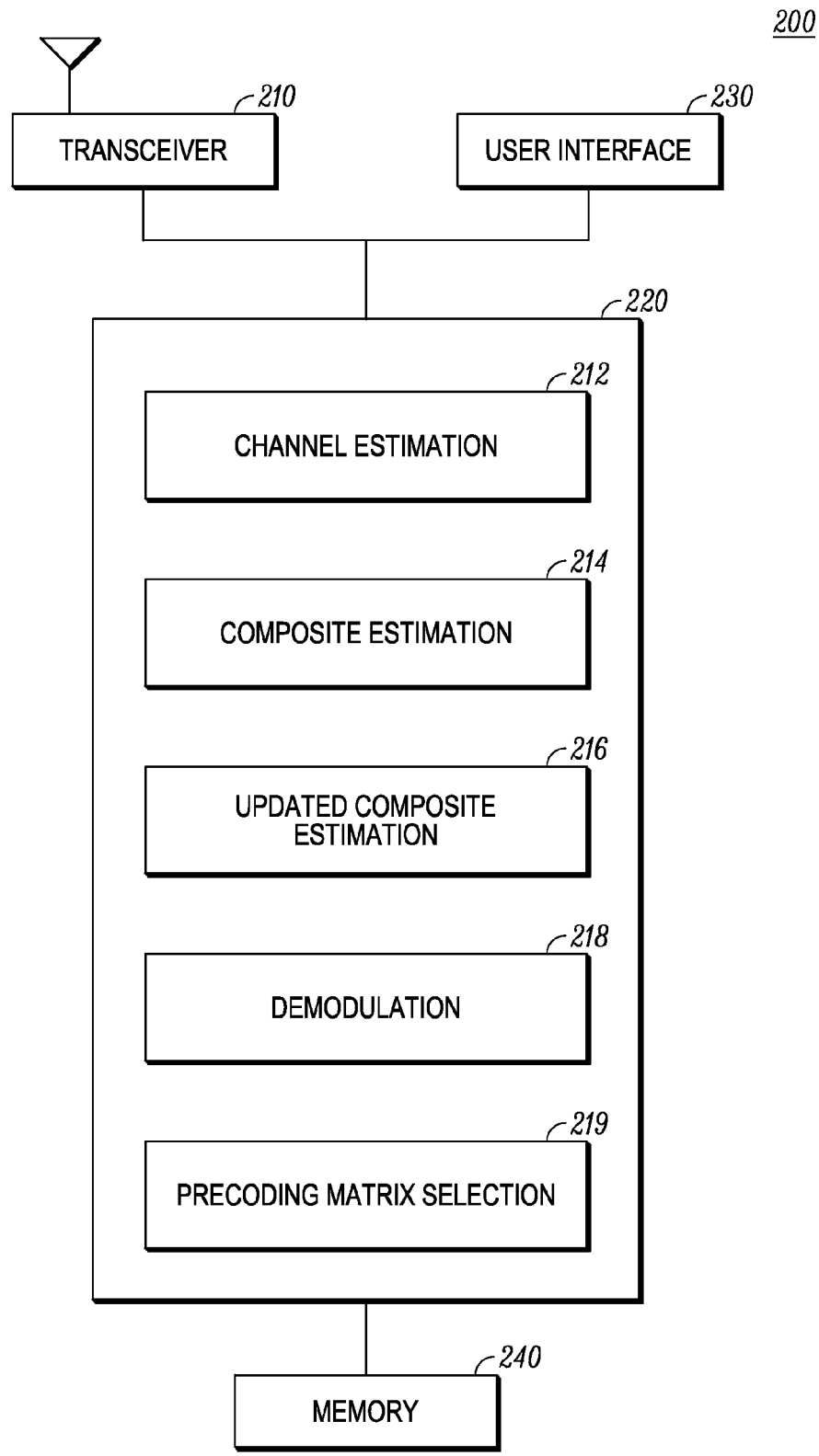
FIG. 2 illustrates a schematic block diagram of a wireless communication device.

FIG. 2 illustrates a wireless communication terminal or device 200 comprising a transceiver 210 communicably coupled to a controller 220. The device implements a wireless communication protocols, as discussed above, and may be capable of conducting circuit or packet switched communications or both. The UE may also comprise a user interface 230 for performing other functionality typically associated with wireless communication terminals, including but not limited to a keypad or other input device, a display, audio inputs and outputs among other user interface devices. These and other elements of such terminals are well known to those of ordinary skill in the art and are not described further herein. In one embodiment, the controller is implemented as a digital processor that executes instruction stored in one or more memory devices 240 to perform the functionality described herein. Alternatively, the controller may be implemented as an equivalent hardware circuit or as a combination of hardware and software implements circuits.

Figure 3:
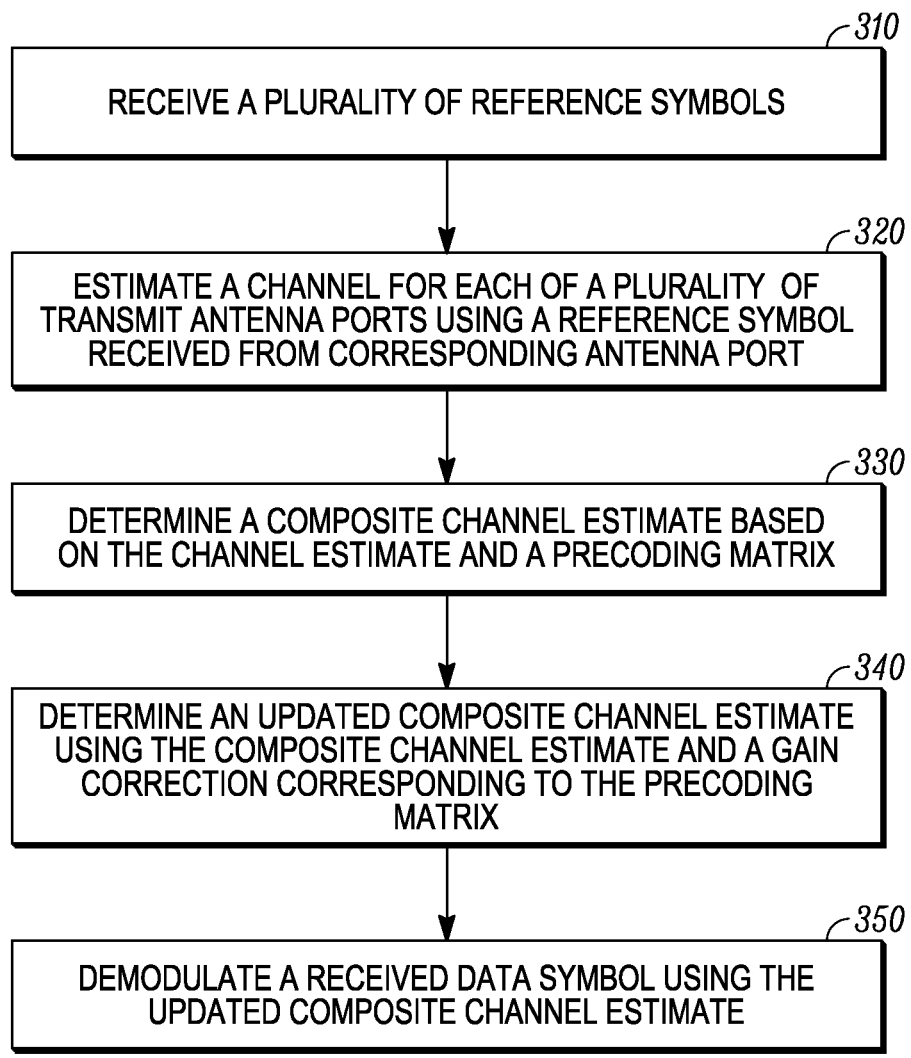
FIG. 3 is a flow diagram for a process implemented on a wireless communication device.
Figure 4:
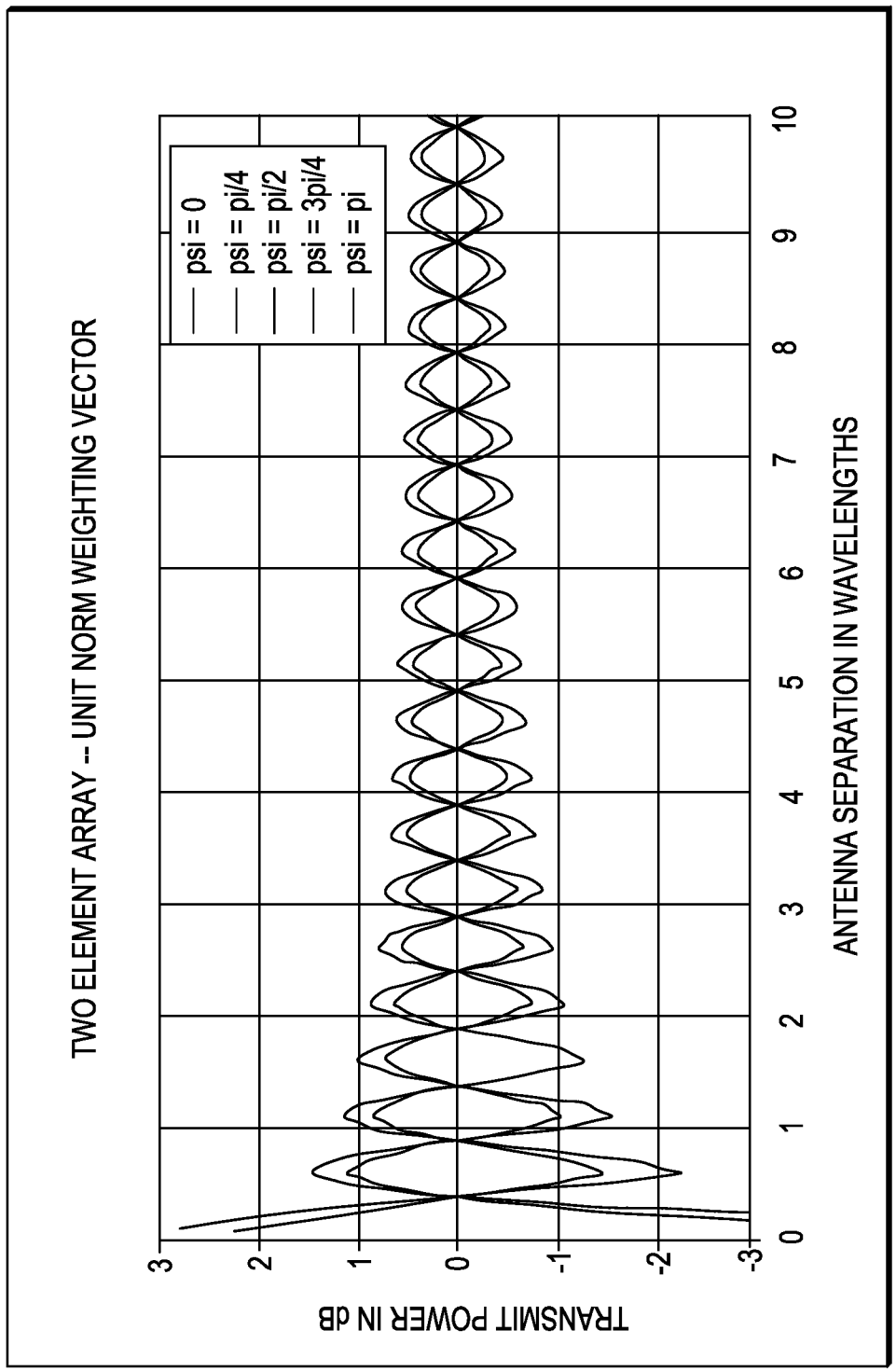
FIG. 4 is a plot of transmit power vs. antenna separation for unit norm weighting vector.

In process diagram 300 of FIG. 3, at 310 wireless communication device receives a plurality of reference symbols. The wireless communication device may be a base unit or a remote unit. In 3GPP UMTS LTE parlance, the wireless communication device is an eNB or a UE. In FIG. 2, the transceiver 210 of the wireless communication device receives signals including reference symbols under control of the processor 220.

In FIG. 3 at 320, the wireless communication device estimates a channel for each of a plurality of transmit antenna ports, of a transmitting device, using a reference symbol received from the corresponding antenna port. In FIG. 2, the processor includes channel estimation functionality 212 that is implemented by executing firmware or software instructions stored in memory. Alternatively, the channel estimation functionality may be implemented by equivalent hardware circuits or by a combination of hardware and software.

In FIG. 3 at 330 the wireless communication device determines a composite channel estimate based on the channels estimated using the reference symbols and based on a precoding matrix. In one embodiment, the wireless communication device determines the composite channel estimate for a symbol that is transmitted from the plurality of transmit antenna ports of the device from which the reference symbols were received, wherein the data symbol is weighted at each transmit antenna port by a corresponding precoding weight obtained from the precoding matrix. Alternatively, the composite channel estimate need not be determined for a transmitted data symbol. In FIG. 2, the processor of the wireless communication device includes composite channel estimation functionality 214 that is implemented by executing firmware or software instructions stored in memory. Alternatively, the composite channel estimation functionality may be implemented by equivalent hardware circuits or by a combination of hardware and software.

In FIG. 3 at 340 the wireless communication device determines an updated composite channel estimate using the composite channel estimate and a gain correction corresponding to the precoding matrix. In FIG. 2, the processor includes updated composite channel estimation functionality 216 that is implemented by executing firmware or software instructions stored in memory. Alternatively, the updated composite channel estimation functionality may be implemented by equivalent hardware circuits or by a combination of hardware and software.

In one embodiment, the wireless communication device obtains the gain correction from a message received from another wireless communication device. In one embodiment, for example, a base unit or a EUTRA eNB signals a gain correction for at least one precoding matrix in a downlink (DL) message. In 3GPP, the message could be a Master Information Block (MIB), or a System Information Block (SIB), or a unicast transmission. In other protocol implementations, the gain correction may be signalled to the wireless communication device in some other message.

In another embodiment, the wireless communication device computes the gain correction. For example, the wireless communication device computes the gain correction based on information obtained or computed from matrix information included in a message received from another entity. In 3GPP LTE, the message in which the matrix is conveyed could be a Master Information Block (MIB), or a System Information Block (SIB), or a unicast transmission. In other protocol implementations, the gain correction may be signalled to the wireless communication device in some other message. In another embodiment, the wireless communication device computes the gain correction based on a ratio of an amplitude of a symbol received at the wireless communication device and an amplitude of the composite channel estimate, wherein the symbol received at the wireless communication device is transmitted using the precoding matrix. In FIG. 2, the processor includes gain correction computation functionality 217 that is implemented by executing firmware or software instructions stored in memory. Alternatively, the updated composite channel estimation functionality may be implemented by equivalent hardware circuits or by a combination of hardware and software. Computation of the gain correction is described further below.

In FIG. 3 at 350, the wireless communication device demodulates a data symbol using the updated composite channel estimate. The data symbol is received from the plurality of transmit antenna ports, wherein the received data symbol having been weighted at each transmit antenna port by the corresponding precoding weight obtained from the precoding matrix. In FIG. 2, the processor of the wireless communication device includes demodulation functionality 218 that is implemented by executing software or firmware instructions stored in memory. Alternatively, the demodulation functionality may be implemented by equivalent hardware circuits or by a combination of hardware and software.

In another embodiment, the wireless communication device transmits a precoding matrix indicator (PMI) associated with the selected precoding matrix to a receiving entity. According to this embodiment, the wireless communication device first determines a plurality of composite channel estimates for a corresponding plurality of precoding matrices in a codebook stored on the device, wherein each of the plurality of composite channel estimates is based on a corresponding precoding matrix. An updated composite channel estimate for each of the plurality of composite channel estimates is determined using the corresponding composite channel estimate and using a corresponding gain correction. Thereafter, the wireless communication device selects a precoding matrix from the codebook for a future transmission, wherein the selection is based on a property of the updated composite channel estimates. In FIG. 2, the processor of the wireless communication device includes precoding matrix selection functionality 219 that is implemented by executing software or firmware instructions stored in memory. Alternatively, the demodulation functionality may be implemented by equivalent hardware circuits or by a combination of hardware and software. The wireless communication device then transmits the PMI associated with the selected precoding matrix to the receiving entity.

In another embodiment, the wireless communication device selects a precoding matrix for a future transmission, wherein the selection is based on a property of the updated composite channel estimate. There after, the wireless communication device determines a channel quality indication or metric (CQI) based on an updated composite channel estimate corresponding to a selected precoding matrix. The channel quality indication could be transport block size, a rank indication or some other metric indicative of channel quality. According to this embodiment, the wireless communication device transmits the channel quality metric on an uplink channel.

The gain correction can be characterized as a ratio of the amplitude of the (actual) composite channel for a data symbol transmitted using a particular PMI to the amplitude of the composite channel estimate resulting from application of the same PMI to the per antenna port channel estimates. If a reference symbol whose amplitude relative to the CRS reference symbols is known is transmitted with a weighting corresponding to a particular PMI matrix, the UE can estimate the gain correction as the ratio of the amplitude of the received reference symbol to the amplitude of the composite channel corresponding to the same PMI matrix. The gain correction for each PMI can be computed at the eNB if the matrix Q defined in Equation (13) is known. Similarly, the gain correction for each PMI can be computed at the UE if the matrix Q in Equation (13) is known to the UE. The gain correction can be expressed quantitatively by Equation (14) below.

Alternative methods for providing more accurate antenna array normalization information to a wireless communication device are described further below. In the discussion, normalization is performed at a base unit, for example at a EUTRA eNB, which provides the gain correction to a UE. More generally however, the normalization may be performed at the UE or any wireless communication device with a MIMO antenna array. In a first embodiment, a transmit antenna array is characterized by a complex matrix Q of size equal to a dimension of the array. As this matrix is Hermitian, it is sufficient to provide the UE with only the upper diagonal or lower diagonal values of the complex matrix. This matrix is used to perform the pattern normalization necessary to compute a complex channel gain for each PMI. In a second embodiment, the UE is provided directly with a real-valued gain for each PMI vector. The complex Q matrix is only a function of the transmitter antenna array and thus the complex Q matrix is common to all UEs served by that array. As a result, the information can be sent over common channels such as the MIB or SIB. Alternatively, this information can be sent over dedicated channels. Similarly, PMI scaling or correction values are only a function of the PMI matrix and not of the UE served by the array. As a result, the PMI correction values can be sent over common channels such as the MIB or SIB. Alternatively, this information can be sent over dedicated channels.

If the antenna array is calibrated, then the Q matrix and the PMI gain correction values will be time-invariant. As a result, these values can be computed only once. Conversely, if the antenna array is not calibrated so that the relative phases of the antenna feeds change over time, then the Q matrix calculation and the PMI correction values must be periodically recalculated and/or re-measured. Calculation of the Q matrix would most likely be done using an antenna chamber, while it may be possible for the UE to directly estimate the PMI gain correction values in a decision-directed manner.

If the UE can accurately estimate the PMI correction values, then it might not be necessary for the eNB to send these values to the UE. However, given that some UEs may have poor signal-to-noise ratio (SNR) and/or may not observe all PMI values with sufficient frequency, it may be best for the UEs to send their measurements of the gain corrections for each PMI to the eNB, where the eNB can combine these estimates and send improved estimates to all UEs via the MIB or SIB. Thus in some embodiments, the base unit or other entity determines the gain correction for a precoding matrix based on a measurement received from one or more other wireless communication devices.

If the array is not calibrated, then the relative phases of the feeds must not change too quickly over time, or it will not be possible for the eNB to collect, combine, and transmit the PMI correction values before the values become out-of-date and obsolete. If the relative phases change very quickly, then even if the UE can estimate the correction values, the correction values estimated in one time slot may be obsolete by the time the UE can apply these correction values. Note that the PMI correction values cannot be computed by a single UE within a single time slot because only a single PMI is used.

In one embodiment, the base unit determines the gain correction for a precoding matrix based on a calibration procedure (e.g., antenna range measurement or active calibration process within the transmitter antenna array subsystem.

The calculation of transmit power for a 2-element array is described below. Consider a 2-element array in which each of the two array elements is an omni-directional antenna. For this example, it is assumed that the omni-directional antenna radiates only in the plane, so that $$p(\phi, \theta) = \begin{cases} \frac{1}{2\pi} & \phi = 0, 0 \leq \theta < 2\pi \\ 0 & \phi \neq 0 \end{cases} \quad (1)$$

where $p(\phi,\theta)$ denotes the element pattern, and $\phi$ ($-\pi/2 \leq \phi \leq \pi/2$) and $\theta$ ($0 \leq \theta \leq 2\pi$) denote the antenna elevation and azimuth, respectively. Note that the omni-directional element is scaled such that it radiates unit power in the plane.

Let $w_0$ and $w_1$ denote the weighting coefficients applied to the first and second antenna elements, respectively, and let $d \cdot \lambda$ denote the spacing of the two elements, where $\lambda$ denotes the signal wavelength. The resulting far-field array pattern as a function of azimuth is then given by $$a_w(\theta) = \frac{1}{\sqrt{2\pi}} \left( w_0 + w_1 e^{-j\frac{2\pi}{\lambda}(d\lambda)\sin\theta} \right) \quad (2)$$

$$= \frac{1}{\sqrt{2\pi}} (w_0 + w_1 e^{-j2\pi d \sin\theta})$$

In the 3GPP model, it is assumed that the power radiated from the array in Equation (2) is equal for all weighting vectors w for which the square of the $L_2$ norm $\|w\|^2 = |w_1|^2 + |w_2|^2$ is held constant (or equivalently, so long as the $L_2$ norm is held constant). However, this assumption can be shown to be false with a simple counterexample. Specifically, for this simple two element example, it will be shown that we can select any number of pairs of weighting vectors w and v such that $\|w\|^2 = \|v\|^2$ and yet the resulting antenna patterns do not radiate equal power.

The power radiated from an antenna is equal to the integral of the square of the magnitude of the far field antenna pattern, so that the radiated power is given by $$\int_0^{2\pi} \|a_w(\theta)\|^2 d\theta, \quad (3)$$

where in this example, it is only necessary to integrate over the azimuth $\theta$ as the element pattern $p(\phi,\theta)$ has been defined such that it radiates only in the plane. More generally, it would be necessary to integrate also over the elevation angle $\phi$. The example can be simplified further if, in addition to the requirement that $\|w\|^2 = 1$, we further require that the complex weights $w_0$ and $w_1$ have equal magnitude so that $|w_0| = |w_1| = 1/\sqrt{2}$. Without further loss of generality, we then have that $$w_0 = 1/\sqrt{2}$$

$$w_1 = e^{j\psi}/\sqrt{2} \quad (4)$$

so that $\|w\|^2 = 1$, regardless of the phase difference $\psi$. With these complex weights, the antenna pattern is given by $$a_w(\theta) = \frac{1}{2\sqrt{\pi}} (1 + e^{-j(\psi + 2\pi d \sin\theta)}), \quad (5)$$

and the transmitted power is given by $$\int_0^{2\pi} |a_w(\theta)|^2 d\theta = \int_0^{2\pi} \frac{1}{4\pi} |1 + e^{-j(\psi + 2\pi d \sin\theta)}|^2 d\theta \quad (6)$$

$$= \frac{1}{4\pi} \int_0^{2\pi} (2 + 2\cos(\psi + 2\pi d \sin\theta)) d\theta$$

$$= 1 + \frac{1}{4\pi} \int_0^{2\pi} 2(\cos(\psi)\cos(2\pi d \sin\theta) - \sin(\psi)\sin(2\pi d \sin\theta)) d\theta$$

$$= 1 + \frac{1}{4\pi} \int_0^{2\pi} 2\cos(\psi)\cos(2\pi d \sin\theta) d\theta$$

where the term $\sin(\psi)\sin(2\pi d \sin\theta)$ is dropped in the last step as it is an odd function of $\theta$ and thus integrates to 0 over the interval [0, $2\pi$). The radiated power as calculated in Equation (6) is given in dB as a function of the antenna separation d in wavelengths for several different values of the phase difference $\psi$ between the two elements. As the antenna separation goes to zero, the radiated power varies from a maximum of 2 (3 dB) to a minimum of 0 (−infinite dB) in spite of the fact that in all cases $\|w\|^2=1$.

Two other observations can be made from this two-element example. First, with an antenna separation of one-half wavelength, the radiated power varies from −1.58 dB ($\psi=0$) to 1.15 dB ($\psi=\pi$). Thus, the power can vary by 2.73 dB as a function of the antenna phase difference, even while the norm of the weighting vector is held constant (could be slightly more if evaluated over all values of $\psi$). Second, as the antenna separation increases, the variation of power as a function of the relative phase $\psi$ decreases. Specifically, with an antenna separation equal to 9.5$\lambda$, the radiated power varies from a minimum of −0.33 dB ($\psi=0$) to a maximum of 0.31 dB ($\psi=\pi$), so that the difference is only 0.62 dB (could be slightly more if evaluated over all values of $\psi$).

Normalization of the antenna pattern is described below. If, as is typically assumed, the input impedance of the array is matched for all values of the phase difference $\psi$, then it must follow that the power radiated from the antenna is equal to the square of the square of the $L_2$ norm of the excitation vector. At first glance, this requirement may seem contradictory since the value of $\|w\|^2$ is constant, and yet the radiated power for the antenna pattern in Equation (5) is also a function of the relative phase $\psi$. The solution to this seeming contradiction is that if the impedance to the array is matched so that the radiated power is equal to $\|w\|^2$, then the antenna pattern is not given by Equation (2), but rather is given by the normalized pattern $$a_{w,n}(\theta) = \frac{\|w\| \frac{1}{\sqrt{2\pi}}(w_0 + w_1 e^{-j2\pi d\sin\theta})}{\left(\int_0^{2\pi} \left|\frac{1}{\sqrt{2\pi}}(w_0 + w_1 e^{-j2\pi d\sin\phi})\right|^2 d\phi\right)^{1/2}} \quad (7)$$

where the subscript n denotes that the pattern is normalized to have radiated power equal to $\|w\|^2$. For the normalized antenna pattern in Equation (7), the radiated power is given by $$\int_0^{2\pi} |a_{w,n}(\theta)|^2 d\theta = \int_0^{2\pi} \left|\frac{\frac{1}{\sqrt{2\pi}}(w_0 + w_1 e^{-j2\pi d\sin\theta})}{\left(\int_0^{2\pi}\left|\frac{1}{\sqrt{2\pi}}(w_0 + w_1 e^{-j2\pi d\sin\phi})\right|^2 d\phi\right)^{1/2}}\right|^2 d\theta$$

$$= \frac{\|w\|^2}{\left(\int_0^{2\pi}\left|\frac{1}{\sqrt{2\pi}}(w_0 + w_1 e^{-j2\pi d\sin\phi})\right|^2 d\phi\right)} \int_0^{2\pi}\left|\frac{1}{\sqrt{2\pi}}(w_0 + w_1 e^{-j2\pi d\sin\theta})\right|^2 d\theta$$

$$= \|w\|^2.$$

(8). To reiterate, if the input impedance to the antenna array is matched so that the radiated power is equal to $\|w\|^2$, then the resulting antenna array pattern is given by Equation (7) and not by Equation (2). Without this normalization, we have a clear contradiction in that the power into the array does not equal the power out of the array.

Correction of PMI-based channel estimation is described below. For several of the 3GPP transmission modes, the channel estimate for the data is generated by application of the PMI to the channel estimates for each transmit antenna port. However, the PMI-based channel estimate assumes that the far field-antenna pattern is the PMI-based linear combination of the channel estimates for the individual ports. In order for this assumption to be correct, the antenna pattern must be as given as in Equation (2). However, the antenna pattern in Equation (2) is not normalized to have energy equal to $\|w\|^2$, If the antenna pattern is normalized to $\|w\|^2$ (as it should be to comply with the specification), the PMI-based channel estimate will be in error by a real-valued normalization scalar (for the two-element array, this factor is given in Equation (9) below). In order to properly compute the channel estimate, the UE must know the correct normalization scalar for each PMI. Specifically, for the two-element example in Equation (2), the normalization scalar is given by $$\left(\int_0^{2\pi}\left|\frac{1}{\sqrt{2\pi}}(w_0 + w_1 e^{-j2\pi d\sin\phi})\right|^2 d\phi\right)^{1/2} \quad (9)$$

For the specific example in which the precoding vector w is $$w_0 = 1/\sqrt{2}$$

$$w_1 = e^{j\psi}/\sqrt{2} \quad (10)$$

the normalization scalar is given by $$\left(\int_0^{2\pi}\left|\frac{1}{2\sqrt{\pi}}(1 + e^{-j(\psi+2\pi d\sin\theta)})\right|^2\right)^{-1/2} \quad (11)$$

Correction of PMI-based CQI estimation is described below. In order to estimate the channel quality (CQI) or channel state (CSI), it must be possible to correctly estimate the channel that results with the application of each PMI. For the reasons identified above, without a per-PMI gain normalization correction, the complex channel estimate for each PMI will have a scaling error, and this will result in an error in the calculation of the CQI. If the UE has access to the per-PMI based normalization correction, then the UE can correctly compute the CQI and/or CSI for each PMI. With the correct gain normalization, the UE can correctly determine the best PMI and the associated CSI/CQI.

Calculation of the Transmitted Power for General Antenna Arrays is described below. For the purposes of this analysis, consider the more general case in which in which the number of antenna elements is K. Furthermore, the array elements need not be required to have the same pattern, though typically it is assumed that this is the case. Let the complex vector $q(\theta,\phi)$ of length K denote the antenna patterns for these elements, where as before, $\phi(-\pi/2 \leq \phi \leq \pi/2)$ and $\theta(0 \leq \theta \leq 2\pi)$ denote the antenna elevation and azimuth, respectively.

The transmitted power is given by $$\int_0^{\pi}\int_0^{2\pi} |w^H q(\theta,\phi)|^2 \sin(\phi) d\theta d\phi = \quad (12)$$

$$\int_0^{\pi}\int_0^{2\pi} w^H q(\theta,\phi) q^H(\theta,\phi) w \sin(\phi) d\theta d\phi =$$

$$w^H \left(\int_0^{\pi}\int_0^{2\pi} q(\theta,\phi) q^H(\theta,\phi) \sin(\phi) d\theta d\phi\right) w = w^H Q w$$

where the matrix Q is defined as $$Q = \int_0^\pi \int_0^{2\pi} q(\theta,\phi) q^H(\theta,\phi) \sin(\phi) d\theta d\phi \qquad (13)$$

It can be noted that the Q matrix has the following properties: the dimension of the Q matrix is K×K, where K is the number of antenna elements in the transmitter array; and from the definition of the Q matrix, it is apparent that the Q matrix is Hermitian so that $Q^H = Q$.

In general, each PMI is a matrix of dimension K×L, where K is the number of antennas (or antenna ports) in the array, and L is the number of transmission layers. We assume that each vector of the PMI matrix must satisfy the same unit energy constraint. Let w the precoding vector for a given transmission layer, or equivalently, let w denote any column of the PMI. It then follows that the correction factor needed for this precoding vector is given by the square-root of the inverse of the corresponding transmitted energy, or equivalently, by $$(w^H Q w)^{-1/2}. \qquad (14)$$

where w is the precoding matrix Q is determined by the antenna element patterns and the spacing of the antenna elements. Thus, there is a normalization correction factor associated with each column of each PMI. These normalization factors must be sent from the eNB to the UE, or they must be learned by the UE.

Signaling of Gain Normalization Correction Factors to the UE is described further below. The gain normalization correction factors for each PMI may be transmitted to the UE's in several forms. In one form, the eNB can transmit the gain normalization correction factors for each PMI to the UE. The gain normalization correction factor for each possible precoding vector must be measured and/or calculated and transmitted to the UE. Note that for a multiple layer PMI matrix, one correction factor must be sent for each layer. In most instances, different PMI matrices will have some predoding vectors in common. It is sufficient for the UE to measure and/or calculate the gain normalization for each possible precoding vector (over the union of all possible PMI's) to the UE. The gain normalization correction factors are dependent only on the PMI, and not on the UE. Thus, the gain normalization correction factors may be sent over common channels such as the MIB or SIB. Alternatively, the gain correction factors can be sent to the UE's over dedicated channels.

In an alternative embodiment, the Q matrix is sent to the UE. With knowledge of the Q matrix, the UE can compute the gain normalization correction factors itself. As noted in the previous section, the Q matrix is Hermitian, so it is only necessary to send UE either the upper triangular values or the lower triangular values of the matrix. If the transmit antenna array has K elements, then it is only necessary to send K real values and K×(K−1)/2 complex values (equivalently, a total of $K^2$ real values) to the UE in order for the UE to be able to compute the gain correction values. Depending on the number of antennas and the number of PMI matrices, in some cases it will be more efficient to send a gain correction for each PMI matrix, while in other cases it will be more efficient to send the values of the Q matrix.

The gain normalization correction factors must be estimated or measured. In some cases, it may be possible to measure the Q matrix for the antenna array in an antenna chamber. Conversely, it may be possible to measure the patterns $q(\theta,\phi)$ of the individual elements of the array separately.

If the phase difference between the antenna feeds is known or can be measured, then the Q matrix can be computed using numerical integration.

Another alternative is for the UE to measure the gain normalization correction factors in some manner. For example, the UE can try to estimate the difference in amplitude between the composite or synthesized pilot (by application of the PMI to the complex channel gain measured for each port) and the computed amplitude. Since this difference is only a function of the PMI and not of the UE, these measurements can be fed back to the eNB. The eNB can combine the estimates from the UEs to form a better estimate, which can then be sent out via the MIB or SIB. It should be noted that the UE can only measure the gain correction factor for the PMI that is used to send the data. Thus, if the set of PMI matrices is large, it may take a while before the UE has an opportunity to measure all of the gain correction factors. It should further be noted that the quality of the measurements will depend on the signal to interference plus noise ratio (SINR) for the UE. For UE at the edge of coverage, the quality of the estimate may be poor and thus the eNB may choose to discard or de-emphasize such measurements.

If the relative phase of the antenna feeds changes rapidly, the estimates of the gain correction factors may be obsolete before they can be applied. In particular, the gain corrections factors used for PMI/CQI selection may be obsolete before they can be used, as calculation of the PMI/CQI feedback requires gain normalization correction estimates for all PMI's, but the UE can only estimate the gain normalization correction for the PMI used for the current subframe.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication device comprising:
a transceiver;
a processor coupled to the transceiver;
the processor configured to estimate a channel for each of a plurality of transmit antenna ports using a reference symbol received from the corresponding antenna port;
the processor configured to determine a composite channel estimate based on the estimated channels and based on a precoding matrix; and
the processor configured to determine an updated composite channel estimate using the composite channel estimate and additionally using a gain correction for the precoding matrix,
wherein the gain correction is based on a data symbol transmitted using the precoding matrix and received at the wireless communication device.

2. The device of claim 1, the processor configured to demodulate the data symbol transmitted using the precoding matrix and received at the wireless communication device using the updated composite channel estimate.

3. The device of claim 2, wherein the data symbol is weighted at each transmit antenna port by a corresponding precoding weight obtained from the precoding matrix.

4. The device of claim 1, the processor configured to determine a plurality of composite channel estimates for a corresponding plurality of precoding matrices in a codebook of the wireless communication device;

the processor configured to determine an updated composite channel estimate for each of the plurality of composite channel estimates using the corresponding composite channel estimate and using a corresponding gain correction;

the processor configured to select a precoding matrix from the codebook for a future transmission, the selection based on a property of the updated composite channel estimates; and the wireless communication device configured to transmit a precoding matrix indicator associated with the selected precoding matrix.

5. The device of claim 1, the processor configured to select a precoding matrix for a future transmission, the selection based on a property of the updated composite channel estimate;

the processor configured to determine a channel quality metric based on the updated composite channel estimate corresponding to the selected precoding matrix; and the wireless communication device configured to transmit the channel quality metric on an uplink channel.

6. The device of claim 5, wherein the channel quality metric is either a transport block size or a rank indication.

7. The device of claim 1, the processor configured to determine the gain correction.

8. The device of claim 7, wherein the gain correction is further based on a ratio of an amplitude of the data symbol received at the wireless communication device and an amplitude of the composite channel estimate.

9. A method in a wireless communication device, the method comprising:

receiving a plurality of reference symbols at the wireless communication device;

estimating a channel for each of a plurality of transmit antenna ports using a reference symbol received from the corresponding antenna port;

determining a composite channel estimate based on the estimated channels and based on a precoding matrix; and determining an updated composite channel estimate using the composite channel estimate and additionally a gain correction for the precoding matrix, wherein the gain correction is based on a data symbol transmitted using the precoding matrix and received at the wireless communication device.

10. The method of claim 9 further comprising receiving the data symbol, transmitted using the precoding matrix, from the plurality of transmit antenna ports, wherein the data symbol is weighted at each transmit antenna port by a corresponding precoding weight obtained from the precoding matrix; and demodulating the data symbol using the updated composite channel estimate.

11. The method of claim 9 further comprising:

determining a plurality of composite channel estimates for a corresponding plurality of precoding matrices in a codebook;

determining an updated composite channel estimate for each of the plurality of composite channel estimates using the corresponding composite channel estimate and a corresponding gain correction;

selecting a precoding matrix from the codebook for a future transmission, the selection based on a property of the updated composite channel estimates; and transmitting, on an uplink channel, a precoding matrix indicator associated with the selected precoding matrix.

12. The method of claim 9 further comprising selecting a precoding matrix for a future transmission, the selection based on a property of the updated composite channel estimate;

determining a channel quality metric based on the updated composite channel estimate corresponding to the selected precoding matrix; and transmitting based on the channel quality metric on an uplink channel.

13. The method of claim 9 further comprising receiving the gain correction in a message selected from a group comprising:

a Master Information Block (MIB);
a System Information Block (SIB); and
a unicast transmission.

14. The method of claim 9 further comprising receiving matrix information from which the gain correction can be computed, the matrix information received in a message selected from a group comprising:

a Master Information Block (MIB);
a System Information Block (SIB); and
a unicast transmission.

15. The method of claim 9 further comprising determining the gain correction at the wireless communication device as a ratio of an amplitude of the data symbol received at the wireless communication device and an amplitude of the composite channel estimate.

16. The method of claim 15 further comprising transmitting from the wireless communication device the gain correction.

17. The method of claim 10 in which the gain correction for a precoding matrix is based on a measurement received from a wireless terminal.

18. The method of claim 10 in which the gain correction for a precoding matrix is based on a calibration procedure.

19. The method of claim 10, wherein the reference symbol transmitted from the plurality of antenna ports has amplitude which is known to the wireless communication terminal.

20. The method of claim 10, wherein the reference symbol transmitted from the plurality of antenna ports is a demodulation reference symbol (DMRS) used for the demodulation of data symbols.

21. The device of claim 1, wherein the gain correction corrects a normalization scaling error of the composite channel estimate that exists as a result of the precoding matrix and at least another precoding matrix of a codebook of the wireless communication device yielding a set of antenna patterns having equal energy.

22. The method of claim 10, wherein the gain correction corrects a normalization scaling error of the composite channel estimate that exists as a result of the precoding matrix and at least another precoding matrix of a codebook of the wireless communication device yielding a set of antenna patterns having equal energy.

* * * * *